Patented Feb. 14, 1939

2,147,180

UNITED STATES PATENT OFFICE 2,147,180

MOISTUREPROOF COATING

Richard Theodore Ubben, Berea, Ohio, assignor to E. I. du Pont de Nemours & Company, Wilmington, Del., a corporation of Delaware No Drawing. Application May 19, 1937, Serial No. 143,529

8 Claims. (Cl. 91—68)

This invention relates to compositions of matter, and in particular it relates to the use of such compositions in moistureproofing of regenerated cellulose film and films of similar character.

Various methods for coating regenerated cellulose film to produce moistureproof wrapping tissues have been disclosed in the prior art, including Charch and Prindle U. S. Patent No. 1,737,187, issued November 26, 1929. In general, this moistureproofness is obtained by applying to the cellulosic base a composition comprising a cellulosic material such as cellulose nitrate, a solvent therefor, a wax or wax-like material, a plasticizer and a blending agent. In many instances, the blending agent is a resin and in such case, in addition to its blending characteristic, it may also have certain film-forming characteristics. Similarly, in the case of certain resins, more or less plasticizing action on the cellulose derivative comprising the base of the moistureproofing composition is exercised by the resin.

In the preparation of moistureproofing coating compositions of the type just described, it has been customary to employ as the resinous constituent natural or synthetic resins such as damar, copal, kauri, polybasic acid-polyhydric alcohol resinous condensation products with or without the addition of modifying agents such as monohydric alcohols, monobasic acids, drying oils, non-drying oils, etc. Of the commonly useful resins, damar has been recognized as the most desirable of the known resins for use in moistureproofing compositions. Attempts to use rosin or ester gum have met with only partial success because of undesirable properties possessed by them, namely, brittleness, relatively poor weathering properties, poor blending action for wax, and a tendency to change and to degrade as to color, transparency, flexibility, odor, and even solubility.

Films coated with moistureproofing compositions are used to package many articles of commerce. One of the commonest and simplest methods for sealing such packages so that they are completely enclosed is merely by means of heat and pressure. In view of the great toughness of the wrapping tissue, however, it is often extremely difficult to open such packages without the use of special devices. With articles such as cigars, therefore, it is desirable to form a seal which can be broken open relatively easily, and still keep the articles in a fresh condition. The strength of bond formed by means of heat and pressure, referred to hereinafter as "heat-seal bond" depends to a large extent on the type of resin used. With gum damar, however, the strength of heat-seal bond cannot be substantially varied by increasing the amount of resin used. Since it is a matter of the utmost importance to secure an accurately controlled strength of heat-seal bond in packaging certain articles, it is easily seen that any factor that can secure this control without sacrificing other desirable characteristics will be widely accepted in the art.

One object of this invention relates to new compositions of matter. Another object of the present invention is to prepare highly satisfactory and low cost compositions for use in the moistureproofing of wrapping tissues. It is a further object of the invention to secure a controlled strength of heat-seal bond over a wide range. Other objects of the invention will appear hereinafter.

For the purposes of this invention, moistureproof materials are defined as those which, in the form of a thin, continuous and unbroken film, will permit the passage of not more than 690 grams of water vapor per 100 square meters per hour, over a period of 24 hours at approximately 39.5° C.±0.5° C., the relative humidity of the atmosphere at one side of the film being maintained at least at 98% and the relative humidity of the atmosphere at the other side being maintained at such a value as to give a humidity differential of at least 95%.

Moistureproofing coating compositions are defined as those which, when laid down in the form of thin, continuous, unbroken films, applied uniformly as a coating with a total coating thickness not exceeding 0.005″ to both sides of a sheet of regenerated cellulose of thickness approximately 0.0009″, will produce a coated product which is moistureproof.

For the purposes of experimental tests, especially for those materials adaptable as coating compositions, moistureproof materials include those substances, compounds or compositions which, when laid down in the form of a continuous, unbroken film, applied uniformly as a coating with a total coating thickness not exceeding 0.0005″ to both sides of a sheet of regenerated cellulose of thickness approximately 0.0009″, will produce a coated sheet which will permit the passage therethrough of not more than 690 grams of water vapor per 100 square meters per hour over a period of approximately 24 hours, at a temperature of 39.5°C.±0.5°C. (preferably 39.5°C.±0.25°C.) with a water vapor pressure differential of 50–55 mm. (preferably 53.4±0.7 mm.) of mercury. For convenience, the number of grams of water vapor passed under these conditions may be referred to as the "permeability value". An uncoated sheet of regenerated cellulose having a thickness of approximately 0.0009″ will show a permeability value of the order of 6,900.

In the foregoing, it is apparent that under the conditions set forth, a moistureproof regenerated cellulose sheet is capable of resisting the passage of moisture or water vapor therethrough at least ten times as effectively as the uncoated regenerated cellulose sheet.

For the purpose of comparison and definition, the following test has been used to measure the strength of the heat-seal bond. Two strips of the coated material 1½" wide are superimposed one on the other so that opposite faces of the film are in contact. A seal is made across the width of the material at one end by placing the film on a metal plate heated to 130° C. and rolling thereover a roller ⅝" wide weighted to 650 grams. The two strips so sealed are opened at the free ends and placed in a stretching device, such as a Suter testing machine, by gripping each end of the sheet in suitable clamps, one of which is fixed while the other is moved away at a constant speed of 12" per minute. The force in grams required to pull the sheets apart is taken as a measure of the heat-seal bond strength.

In accordance with the present invention, it has been found that a modified rosin such as is described in U. S. Patent No. 2,017,866 can be successfully and advantageously employed as a substitute for damar and the like in moistureproofing compositions. Because of its improved and desirable characteristics such as light color, transparency, flexibility and compatibility with cellulose derivatives and/or waxes or wax-like materials, this modified rosin is particularly well suited to the preparation of these compositions containing waxes or wax-like substances. Its presence in such coating compositions gives a film, the surfaces of which are non-tacky at ordinary or moderately high temperatures but which may be made to adhere by the application of pressure and a relatively high degree of heat. The strength of the heat-seal bond as hereinafter specified is readily varied through a wide range by controlling the proportion of modified rosin in the composition. Furthermore, it has been found that the use of this modified rosin permits a reduction in the amount of plasticizer required to produce suitable moistureproofing coating compositions which will, when deposited in the form of thin films or coatings, result in flexible, transparent and moistureproof layers which are non-tacky, non-smeary, durable and adapted for application to various base materials as will be more specifically set forth hereinafter.

The following table of examples, which are illustrative in character, discloses methods and means for applying the principles of the invention:—

Table

| Example No. | 1 | 2 | 3 | 4 | 5 | 6 | 7 |
| --- | --- | --- | --- | --- | --- | --- | --- |
| Modified rosin | 0.60 | 3.00 | 4.84 | 0.83 | 1.80 | 3.00 | 5.00 |
| Paraffin wax | 0.36 | 0.36 | 0.36 | 0.36 | 0.36 | 0.48 | 1.60 |
| Plasticizer: | | | | | | | |
|   Dibutyl phthalate | 1.22 | 1.92 | | | 2.10 | | |
|   Dicyclohexyl phthalate | 3.67 | 1.92 | | 3.57 | 2.10 | 1.80 | |
|   Monolauryl phthalate | | | 1.20 | | | | |
|   Butyl toluenesulfonamide | | | | 1.24 | | | |
| Nitrocellulose: | | | | | | | |
|   11% N | 6.14 | 4.80 | | | 5.64 | | |
|   11.4% N | | | | 5.95 | | | |
|   11.6% N | | | 5.60 | | | | |
| Ethyl cellulose | | | | | | 6.72 | 13.40 |
|   Total solids | 11.99 | 12.00 | 12.00 | 11.95 | 12.00 | 12.00 | 20.00 |
| Solvents: | | | | | | | |
|   Ethyl acetate | 58.33 | 50.00 | 58.33 | 57.10 | | | |
|   Toluene | 26.35 | 24.67 | 26.34 | 25.95 | 30.00 | 70.33 | 64.00 |
|   Isopropyl alcohol | 3.33 | 3.33 | | | 3.33 | | |
|   Isobutyl acetate | | | | | 54.67 | | |
|   Ethyl alcohol | | | 3.33 | 5.00 | | 17.67 | 16.00 |
| Ratio: | | | | | | | |
|   Cellulose derivative:resin | 10.2 | 1.6 | 1.2 | 7.2 | 3.1 | 2.2 | 2.7 |
|   Resin:wax | 1.7 | 8.3 | 13.4 | 2.3 | 5.0 | 6.2 | 3.1 |
|   Cell. derivative:plasticizer | 1.25 | 1.25 | 4.7 | 1.25 | 1.35 | 3.7 | |

Of the above examples, Example 1 produces a coating with high heat-seal strength. Example 2 produces a coating with low heat-seal strength. Example 5 is preferably applied to cellulose derivatives, such as cellulose acetate.

Modified rosin is compatible with cellulose derivatives, particularly cellulose nitrate and cellulose ethers, such as ethyl or benzyl cellulose. Modified rosin may also be combined in small amounts with cellulose acetate for certain purposes to produce compositions which show marked improvement over those obtained from natural rosin or its derivatives.

Generally speaking, this invention pertains to the provision of moistureproofing coating compositions comprising modified rosin in combination with cellulose derivatives and moistureproofing agents such as waxes or wax-like materials. Such compositions may also include plasticizing agents, drying or non-drying oils, additional resinous materials of either the natural or synthetic varieties, coloring agents either as dyes or pigments, or other modifying agents according to the type of coating composition preferred. The proportions of the ingredients may be varied within wide limits, depending on the properties desired in the finished coating. The total film constituents, for convenience referred to as total solids, may be varied according to the build to be attained; the proportion of modified rosin may determine the hardness, adhesion and gloss; the plasticizer will assist in obtaining suitable flexibility and other constituents will affect other properties. The coating compositions also include solvents and solvent mixtures which are adapted to the purposes of the coating composition and to the method of applying the coating composition to the desired base and can be adjusted in accordance with the practices of one skilled in the art.

In the preparation of moistureproofing coating compositions comprising a cellulose derivative and a wax, it is customary to include some material which will improve the compatibility of the cellulose derivative and the wax, and this material is frequently referred to as a blending agent. A plasticizer is also used to improve the flexibility of the film. Where highly moistureproof compositions are desired, it is essential that more plasticizer be employed than is required to flexibilize the resulting coating. With the large amounts of plasticizer used in producing highly moistureproof coating compositions, the surface characteristics of the product are apt to suffer; that is, the surface may tend to be tacky, easily smeared or otherwise unsatisfactory. Additionally, since the plasticizer is usually the most expensive ingredient, the use of substantial amounts adds materially to the cost of the coating composition and consequently of the coated product. It is apparent, therefore, that any provision for decreasing the amount of plasticizer required while still producing coating compositions which are highly moistureproof, will contribute greatly to the advancement of the art. Modified rosin is particularly well suited to the preparation of moistureproofing compositions containing waxes or wax-like substances. Furthermore, it has been found in accordance with the present invention, that the use of modified rosin permits a reduction in the amount of plasticizer required to produce suitable moistureproofing coating compositions which will, when deposited in the form of thin films or coatings, result in flexible, transparent and moistureproof layers which are non-tacky, non-smeary, durable and adapted for application to various base materials.

By way of illustration may be considered specifically those moistureproofing compositions comprising a cellulose derivative, a resin, a wax or wax-like substance, and a plasticizer. A systematic study of these compositions reveals that with any given plasticizer concentration, a system may be obtained wherein, generally speaking, modified rosin is equal to or better than gum damar in the range of 25–30% plasticizer, while rosin or rosinates, and many other resins are generally poorer. Hence, with the same plasticizer, and with the same or comparable plasticizer concentration, the modified rosin is preferred to rosin and may be equal to or better than other resins, such as damar or ester gum.

There is a variation in strength of heat-seal bond and in moisture permeability value (moistureproofness) with varying proportions of resin. The coated films may be obtained by applying to both sides of regenerated cellulose film, a thin layer of a composition through the medium of a suitable solvent mixture and removing the solvent at an elevated temperature. The strength of heat-seal bond decreases rapidly with increase in concentration of modified rosin, while the moisture permeability remains approximately constant.

Another characteristic in which moistureproof coatings containing modified rosin according to the present invention compare favorably with coatings containing other resins is the fact that it does not become tacky until relatively high temperatures are reached. For example, a coating prepared in accordance with Example 2 above will not adhere to a brass plate until a temperature of 57° C. is reached. Coatings similarly prepared but containing, in place of modified rosin, the same quantity, respectively, of (a) water white rosin, (b) ester gum and (c) gum damar stuck to a brass plate at temperatures of (a) 40° C., (b) 50° C. and (c) 50° C.

The usefulness of the modified rosin is not restricted to any one type of cellulose derivative and the general properties remain relatively the same. A nitrocellulose of low nitrogen content will generally require more plasticizer than a high nitrogen nitrocellulose if a comparable permeability result is to be obtained.

Another important characteristic of modified resin systems is represented by the relation between permeability and resin content with a fixed ratio of cellulose derivative to plasticizer. The permeability of the systems employing modified rosin is generally less than that of the damar systems and furthermore, the permeability of the modified rosin systems is substantially constant over a remarkably long range of resin content.

Although the permeability to vapors of these coated films is greatly affected by the kind of resin present, the kind and amount of plasticizer present, and other characteristics of the coating composition, the primary moistureproofing agent present in the composition is wax. Since wax is the essential component, it is necessary that the resin used in the composition be compatible with the wax. Modified rosin has been found to blend extremely well with waxes suitable for moistureproofing over a wide range of concentrations.

In the wrapping of articles with this coated film, or in the preparation of containers therefrom it is often desired to fasten or seal the edges of the material by the application of heat and pressure. Contrary to what may be supposed, it is not always desirable that the bonds thus prepared should have great strength. Indeed, it may be desirable that the strength of such a bond should lie within very narrow limits so that it will resist certain disruptive forces, but still be loosened by certain other, slightly greater forces. For instance, in the wrapping of cigars with this material, it is highly desirable that all and every part of the seal remain intact during the shipping and handling of the cigar, but still that the wrapper may be easily and conveniently removed by rupturing the seal at the time that the cigar is to be used. This modified rosin, when added to coating compositions, will decrease the strength of a heat-seal bond. Furthermore, the strength of a heat-seal bond is extremely sensitive to small variations in the concentration of modified rosin.

While it is advantageous that overlapping sections of such film may be stuck or sealed together by the application of pressure and heat, it is not desirable that this should take place at low temperatures, such as at room temperature or temperatures slightly higher which may be encountered in the storage of film or articles wrapped therein, or in packaging operations, with the exception of those designed to form such heat seals. Therefore, it is desirable that the temperature required for such heat-sealing should be quite high and that no tackiness should exist below this temperature. As has been observed above, compositions containing modified rosin possess a sticking temperature which is much higher than that obtained with the other resins in general use, such as rosin, ester gum, and damar.

Not only is it desirable that the coating on such tissue be non-tacky and that it does not stick to other sheets and objects with which it may come in contact, but also that it adhere firmly to the film upon which it is deposited. If this coating tends to become loose and peel off, that section of the film which loses its coating will no longer give adequate protection against the escape of vapors and the material thus lost from the surface of the film may foul apparatus, such as automatic wrapping machinery, giving rise to the spoilage of material, loss of time in operation and additional labor. It has been found that coating compositions which contain this modified rosin adhere to the film with great tenacity, thus minimizing these evils.

The unique properties of moistureproofing coating compositions comprising this modified rosin are highly unobvious and the use of such compositions makes possible the practice of many economies, besides resulting in numerous desirable advantages. It is highly unobvious that a material derived from rosin in such a manner as this material, without the addition of any other substances thereto, should possess properties so distinctly different from those of the original rosin. It is highly unobvious that the resin so obtained, when added to a coating composition, should, despite its flexibility, toughness, etc., decrease markedly the strength of the heat-seal bond. It is very surprising that such modified rosin should give a very tough and durable coating, whereas raw rosin is extremely brittle and tends to crystallize. It is further surprising that the coating obtained with this modified rosin should adhere with great tenacity to the film. When warmed, a coating containing natural rosin becomes tacky at a comparatively low temperature; surprisingly, coating compositions containing modified rosin do not become tacky until heated to considerably higher temperatures. It is highly unobvious that all of these advantages should be found combined in modified rosin which is obtained from rosin not possessing these desirable characteristics.

In compositions employing plasticizers these latter are probably the most expensive of all the constituents and consequently the use of modified rosin permits of a saving by a reduction in the amount of plasticizer needed. The surface characteristics of coated objects depend, in many instances, on the plasticizer content and are consistently improved by a decrease in the plasticizer concentration. Thus, for example, sheets or films of regenerated cellulose coated with moistureproofing compositions must also possess good surface so that adjacent sheets will slip properly for handling and will not smear or adhere to one another when stacked. The reduction of plasticizer concentration over that required for most other resins, without impairment and usually with improvement of moisture impermeability, through the use of modified rosin, offers admirable opportunity for also improving surface slip and the like. Rosin has long been prized in the varnish industry because of its high gloss, good build, easy solubility and low cost. The modified rosin retains the gloss, build and solubility and additionally possesses improved toughness, flexibility and color while the cost of modified rosin still permits its availability at a low price.

The modified rosin, for use in accordance with this invention and as disclosed in U. S. Patent No. 2,017,866, may be prepared by dissolving ordinary rosin in gasoline, adding sulfuric acid and stirring. The gasoline layer which separates from the mixture is washed with water to free it from any free or combined sulfuric acid, and then is distilled to recover the gasoline. The preferred method of preparation is the following.

Six hundred and eighty-three pounds of gum rosin, known to the trade as grade G, is dissolved in 48.5 gallons of solvent naphtha and with vigorous agitation 300 lbs. of 85% sulfuric acid is added while maintaining the temperature below 36.5° C. After four hours agitation, the mixture is diluted by pouring it into 167 gallons of solvent naphtha and a mixture of acid, tar and impurities is allowed to settle out. The supernatant solution of semi-purified resin in solvent naphtha is decanted, washed with water and the solvent removed by distillation. Additional purification is obtained by heat treating the resin at 280° C. and by blowing 2,500 lbs. of steam through the charge.

The modified resin that remains behind in the still is found to be of very light color, much tougher than ordinary rosin and more resistant to shock, and also to have a melting point as defined in U. S. Patent No. 2,017,866 which is much higher than that of the original material. This modified form is quite different from the natural product used in its preparation and these differences in properties are not simply those resulting from a purification. On the other hand, this material is not a synthetic resin in the sense of compounding materials, for nothing has been added to the rosin in this process.

The preparation of this modified form of rosin is not a part of this invention and the method of preparation outlined is intended merely as an illustrative example. This material, prepared in any other way known to the art and as disclosed in U. S. Patent No. 2,017,866, will find application in accordance with the principles of this invention.

For the cellulose derivative it is possible to use cellulose ethers such as glycol, ethyl, or benzyl cellulose, cellulose esters such as cellulose nitrate which is particularly useful, cellulose acetate which is of limited compatibility, and such mixed esters or ether-esters as cellulose acetate-nitrate, cellulose acetate-propionate or ethyl cellulose-nitrate. These cellulose derivatives may be of various degrees of conversion, as, for example, cellulose nitrates of various nitrogen contents. As plasticizers, it is possible to use any of the well known plasticizers, including such substances as tricresyl phosphate, dibutyl phthalate, dicyclohexyl phthalate, di-methylcyclohexyl phthalate, di-(dimethylcyclohexyl) phthalate, di-cyclohexyl adipate, methyl-(dimethylcyclohexyl) adipate and butyl benzoyl benzoate. In some instances, it may be possible to use only very small amounts of plasticizer or even to eliminate the plasticizer entirely.

As moistureproofing agents, it is possible to use waxes or wax-like materials such as paraffin, petrolatum, ceresin, Japan wax, palm wax, beeswax, certain chlorinated hydrocarbons, Chinese insect wax or other synthetic waxes or wax-like materials. The term "wax", as used throughout this specification and claims, is intended to include both true waxes (higher monohydric alcohol esters of higher fatty acids) and wax-like materials such as the above. If some of these substances are too soft for the purposes desired, they may be mixed with harder waxes of the group just listed or with carnauba wax, candelilla wax or other harder synthetic waxes. Indeed, sometimes it may be desirable to use only the harder waxes such as carnauba or candelilla although it is preferable to employ a wax such as paraffin as the moistureproofing agent and to harden this by the addition of carnauba or candelilla wax, if necessary.

In many instances, it may be desirable to add other resinous materials to moistureproofing coating compositions comprising the modified rosin and for this purpose any of the natural or synthetic resins commonly available may be used so long as they are compatible and form homogeneous mixtures. Such resins may include the rosinates, damar, copal, kauri, polyhydric alcohol-polybasic acid resinous condensation products, vinyl derivatives, chlorinated diphenyl resins, soluble phenol-formaldehyde resins, or the like.

For the usual coating methods, these compositions must be available as solutions and for this purpose any of the usual solvents and solvent mixtures familiar to the skilled worker in the art will serve. Generally speaking, the solvent will contain a cellulose derivative solvent and a wax solvent as well as a solvent for the modified rosin and optionally, a diluent. It is apparent that the same solvent may serve both for the modified rosin and the other constituents and indeed, it may be that the cellulose derivative solvent will also be a wax solvent. A solvent mixture comprising 40–90% ethyl acetate, 10–50% toluene and the balance ethyl alcohol will usually be found to operate satisfactorily. Depending on the amount and nature of the cellulose derivative or the wax, the amount and nature of their respective solvents will vary. Satisfactory solvents for specific compositions are illustrated in the accompanying examples.

The moistureproofing coating compositions may be used on various bases including sheets or films of regenerated cellulose, whether they be made by the viscose process, the cupramminium process or by any other manufacturing technique. Sheets or films of cellulose ethers such as ethyl, benzyl, or glycol cellulose, cellulose esters such as cellulose nitrate or cellulose acetate, gelatin, casein, parchment, chemically or mechanically treated or hydrated paper, tissue paper or the like. Surfaces of metal, wood, etc. may also be coated with these compositions.

In the preparation of a transparent, moistureproof wrapping tissue, a suitable wax-containing composition comprising a cellulose derivative and modified rosin may be applied to the desired base in accordance with the methods known to the art. The solvents may be removed and the coated material subjected to an elevated temperature at least equal to the melting point of the wax, whence a clear, transparent, moistureproof film may be obtained. The technique of this procedure is set forth in such patents as the Charch and Prindle patent noted above.

Ordinarily it is preferred to include a cellulose derivative in the moistureproofing composition. Under certain conditions, however, where a cheaper coating is desired and tackiness is not a detriment, a composition comprising only modified rosin and a wax, with or without a plasticizer, may be coated onto a base. An example of such a composition is 9 parts of modified rosin and 1 part of paraffin dissolved in 74 parts of toluene.

Thus far, only moistureproofing coating compositions comprising plasticizing agents have been specifically discussed. As has been stated above, the use of modified rosin permits a reduction of the amount of plasticizer necessary for the preparation of suitable coating compositions. In view of this, it is possible to eliminate special plasticizers and still obtain satisfactory moistureproofing coating compositions by taking advantage of the plasticizing action of the modified rosin itself. Compositions of this sort are illustrated in Example 7 of the table. Generally speaking, compositions of this type are inferior as regards moistureproofness, flexibility, appearance, etc. and consequently compositions employing an additional plasticizer are to be preferred.

In preparing moistureproofing coating compositions comprising modified rosin, it has been found that the best results are obtained by limiting the relative amounts of the several constituents. The amount of cellulose derivative, for example, may vary from 30-70% or more of the total solids although in most instances 55-60% is to be preferred; in certain circumstances, indeed, it may be omitted altogether. If the modified rosin is simply a blending agent, its amount may be of the order of 1-5%, but if it is a substantial part of the film-forming compositions, it may constitute 8-30% or more, while if it serves also as plasticizer, it may be present in amounts as high as 40-50% of the total solids content. Usually it is desirable to maintain the ratio of modified rosin to cellulose derivative in the neighborhood of 1:4 although ratios as low as 1:1.2 or as high as 1:10 may sometimes be advantageous.

The wax content of these moistureproofing compositions may vary from ½% or 1% to 10% or more of the total solids content. Usually, about 4% is satisfactory although more or less may be found desirable for different purposes. The ratio of wax to resin may vary from 1:1.7 to 1:14 although about 1:4 is generally a good combination.

The amount of plasticizer may vary, of course, from none at all up to about 40 or 50% of the solids content of the composition. The ratio of plasticizer to cellulose derivative depends, obviously, on the nature of the cellulose derivative, the nature and amount of wax, and the plasticizer itself, but it has been found that 1:1.25 to 1:5 may produce very good results while an optimum ratio would seem to be about 1:1.5.

The amount of solvent or solvent mixture may vary according to the composition and to the method of application or purpose desired. The viscosity of the coating composition may be controlled by the amount and nature of the solvent and may be adjusted easily to adapt the solution for coating by brushing, spraying, dipping or any other method familiar to the art.

The specification thus far has been concerned primarily with coating compositions. It is within the scope of this invention, however, to produce self-sustaining films having the solids composition set forth. These films may be prepared in any of the ways known to the art as by casting, choosing suitable solvents and solvent contents to facilitate the operation.

Where percentages and proportions of ingredients are referred to throughout the specification and claims, they are intended to be percentages by weight or parts by weight.

The term "modified rosin", as used throughout the present specification and claims, is defined as the rosin described and claimed in U. S. Letters Patent to Morton, No. 2,017,866. This modified rosin is characterized generally by properties similar to those of rosin, but with the difference that it has a molecular weight within the range 5% to 400% greater than ordinary rosin in its pure state; that it has a melting point, as determined by the capillary tube method, above 80° C. and higher than the melting point of pure abietic acid and of purified rosin when in the resinous state; that it is substantially free from combined sulfur and hardening substances held in combination; that it has an iodine value lower than that of pure abietic acid; and that it has a molecular weight higher than that of pure abietic acid.

Any variation or modification of the invention, as described above, which conforms to the spirit of the invention, is intended to be included within the scope of the claims.

I claim:

1. A moistureproofing composition suitable for use in moistureproofing non-fibrous transparent cellulosic sheets or films comprising modified rosin and a wax, said modified rosin being characterized by properties of the general nature of those of rosin, but with the difference that it has a molecular weight within the range 5% to 400% greater than ordinary rosin in its pure state; that it has a melting point, as determined by the capillary tube method, above 85° C. and higher than the melting point of pure abietic acid and of purified rosin when in the resinous state; that it is substantially free from combined sulfur and hardening substances held in combination; that it has an iodine value lower than that of pure abietic acid; and that it has a molecular weight higher than that of pure abietic acid.

2. A moistureproofing composition suitable for use in moistureproofing non-fibrous transparent cellulosic sheets or films comprising modified rosin, a wax and a cellulose derivative, said modified rosin being characterized by properties of the general nature of those of rosin, but with the difference that it has a molecular weight within the range 5% to 400% greater than ordinary rosin in its pure state; that it has a melting point, as determined by the capillary tube method, above 85° C. and higher than the melting point of pure abietic acid and of purified rosin when in the resinous state; that it is substantially free from combined sulfur and hardening substances held in combination; that it has an iodine value lower than that of pure abietic acid; and that it has a molecular weight higher than that of pure abietic acid.

3. A moistureproofing composition suitable for use in moistureproofing non-fibrous transparent cellulosic sheets or films comprising modified rosin, a wax, cellulose nitrate and a plasticizer, said modified rosin being characterized by properties of the general nature of those of rosin, but with the difference that it has a molecular weight within the range 5% to 400% greater than ordinary rosin in its pure state; that it has a melting point, as determined by the capillary tube method, above 85° C. and higher than the melting point of pure abietic acid and of purified rosin when in the resinous state; that it is substantially free from combined sulfur and hardening substances held in combination; that it has an iodine value lower than that of pure abietic acid; and that it has a molecular weight higher than that of pure abietic acid.

4. A moistureproofing composition suitable for use in moistureproofing non-fibrous transparent cellulosic sheets or films comprising 1 to 50 parts modified rosin, ½ to 10 parts wax, 30 to 70 parts cellulose nitrate, and not to exceed 40 parts plasticizer, together with a solvent in an amount sufficient to produce a homogeneous solution, said modified rosin being characterized by properties of the general nature of those of rosin, but with the difference that it has a molecular weight within the range 5% to 400% greater than ordinary rosin in its pure state; that it has a melting point, as determined by the capillary tube method, above 85° C. and higher than the melting point of pure abietic acid and of purified rosin when in the resinous state; that it is substantially free from combined sulfur and hardening substances held in combination; that it has an iodine value lower than that of pure abietic acid; and that it has a molecular weight higher than that of pure abietic acid.

5. A transparent moistureproof film comprising a non-fibrous base having a moistureproof coating containing modified rosin and a wax, said modified rosin being characterized by properties of the general nature of those of rosin, but with the difference that it has a molecular weight within the range 5% to 400% greater than ordinary rosin in its pure state; that it has a melting point, as determined by the capillary tube method, above 85° C. and higher than the melting point of pure abietic acid and of purified rosin when in the resinous state; that it is substantially free from combined sulfur and hardening substances held in combination; that it has an iodine value lower than that of pure abietic acid; and that it has a molecular weight higher than that of pure abietic acid.

6. A transparent moistureproof film comprising a non-fibrous cellulosic base having a moistureproof coating containing modified rosin, a wax and a cellulose derivative, said modified rosin being characterized by properties of the general nature of those of rosin, but with the difference that it has a molecular weight within the range 5% to 400% greater than ordinary rosin in its pure state; that it has a melting point, as determined by the capillary tube method, above 85° C. and higher than the melting point of pure abietic acid and of purified rosin when in the resinous state; that it is substantially free from combined sulfur and hardening substances held in combination; that it has an iodine value lower than that of pure abietic acid; and that it has a molecular weight higher than that of pure abietic acid.

7. A transparent moistureproof film comprising a regenerated cellulose base having a moistureproof coating containing modified rosin, a wax, cellulose nitrate and a plasticizer, said modified rosin being characterized by properties of the general nature of those of rosin, but with the difference that it has a molecular weight within the range 5% to 400% greater than ordinary rosin in its pure state; that it has a melting point, as determined by the capillary tube method, above 85° C. and higher than the melting point of pure abietic acid and of purified rosin when in the resinous state; that it is substantially free from combined sulfur and hardening substances held in combination; that it has an iodine value lower than that of pure abietic acid; and that it has a molecular weight higher than that of pure abietic acid.

8. A transparent moistureproof film comprising a regenerated cellulose base having a moistureproof coating containing 1 to 50 parts modified rosin, ½ to 10 parts wax, 30 to 70 parts cellulose nitrate, and not to exceed 40 parts plasticizer, said modified rosin being characterized by properties of the general nature of those of rosin, but with the difference that it has a molecular weight within the range 5% to 400% greater than ordinary rosin in its pure state; that it has a melting point, as determined by the capillary tube method, above 85° C. and higher than the melting point of pure abietic acid and of purified rosin when in the resinous state; that it is substantially free from combined sulfur and hardening substances held in combination; that it has an iodine value lower than that of pure abietic acid; and that it has a molecular weight higher than that of pure abietic acid.

RICHARD THEODORE UBBEN.

CERTIFICATE OF CORRECTION.

Patent No. 2,147,180. February 14, 1939.

RICHARD THEODORE UBBEN.

It is hereby certified that error appears in the printed specification of the above numbered patent requiring correction as follows: Page 1, second column, line 30, for "0.005''" read 0.0005''; page 3, first column, line 52, for "resin" read rosin; and that the said Letters Patent should be read with this correction therein that the same may conform to the record of the case in the Patent Office.

Signed and sealed this 28th day of March, A. D. 1939.

Henry Van Arsdale (Seal)   Acting Commissioner of Patents.